June 23, 1970          K. G. TOLL          3,516,426
METHOD FOR INSTALLING A THERMOPLASTIC PIPE BRANCHING
SADDLE ON AN OPERATING THERMOPLASTIC MAIN
Filed Dec. 11, 1967
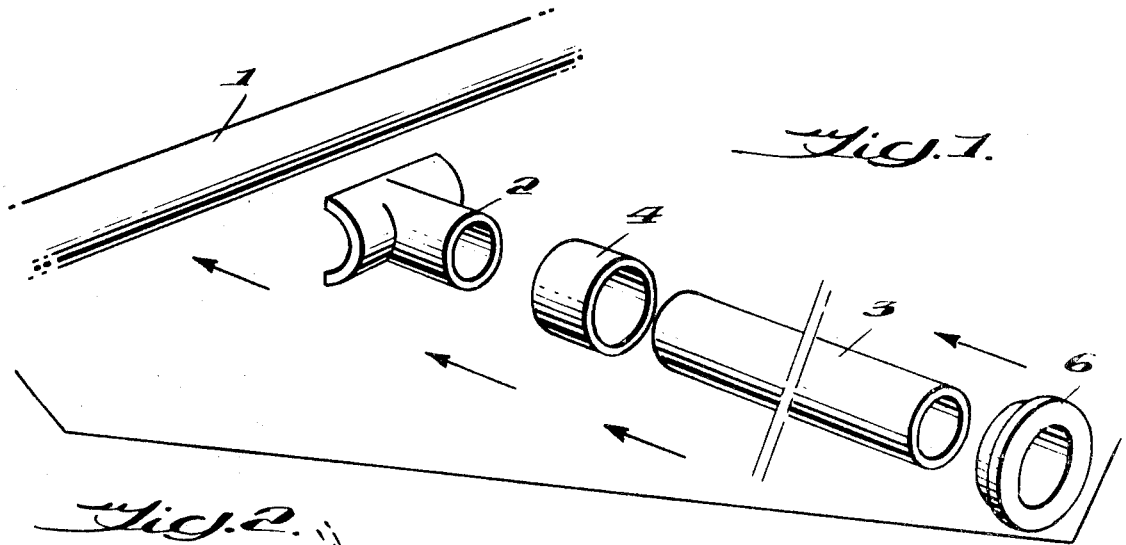
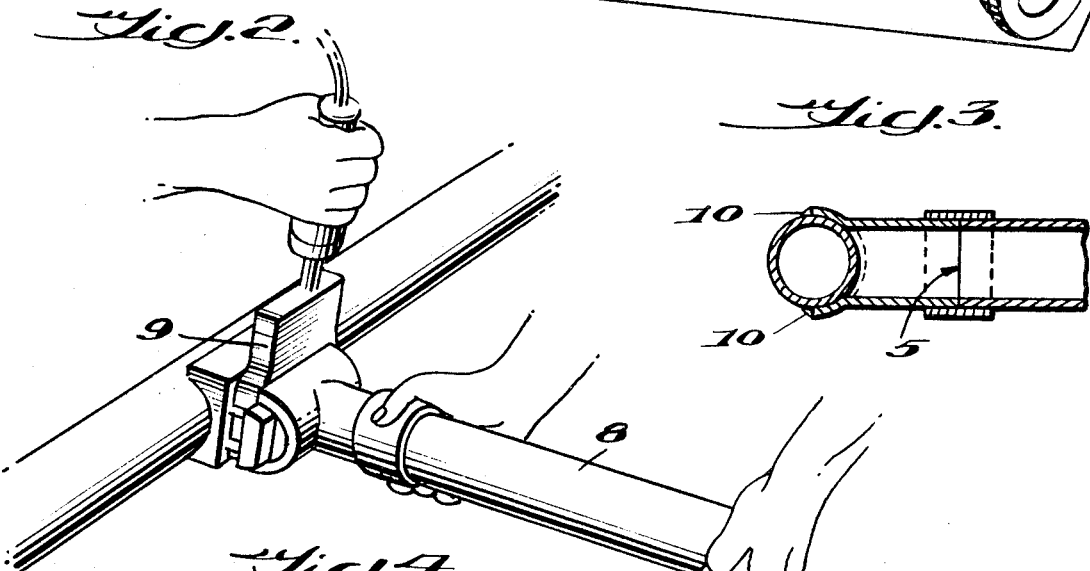
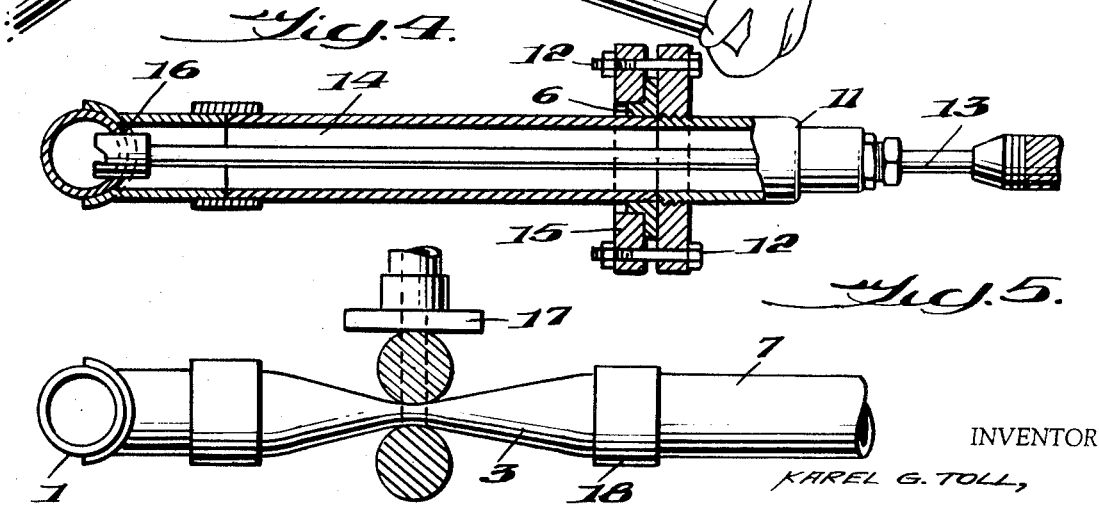
INVENTOR
KAREL G. TOLL,
BY Raymond P. Niro
AGENT 3,516,426
METHOD FOR INSTALLING A THERMOPLASTIC PIPE BRANCHING SADDLE ON AN OPERATING THERMOPLASTIC MAIN
Karel Greenlie Toll, Tulsa, Okla., assignor to E. I. du Pont de Nemours and Company, Wilmington, Del., a corporation of Delaware
Filed Dec. 11, 1967, Ser. No. 689,693
Int. Cl. F16b *13/00;* B23b *41/08*
U.S. Cl. 137—15                                                5 Claims

ABSTRACT OF THE DISCLOSURE

A thermoplastic pipe branching saddle assembly is connected to an operating thermoplastic main by thermally fusing the saddle assembly to the main, using a cutting element to form an opening in the main, removing the cutting element from the saddle assembly, forcing the walls of a tubular portion of the saddle assembly together to block the flow of gas from the main, joining a section of plastic pipe to the saddle assembly and then removing the force applied to the walls of the tubular portion of the saddle assembly to permit the flow of gas through the newly joined section of the plastic pipe.

BACKGROUND OF THE INVENTION

Field of the invention

This invention relates to the field of fluid transportation systems, such as gas transmission lines in which conduits formed from plastic materials are used for the distribution of fluid. More specifically, this invention concerns a method for connecting individual branch lines into an operating supply main without interrupting service on the main.

Description of the prior art

Pipes made from thermoplastic resins are frequently used for transporting fluids such as natural gas under pressure. Thermoplastic pipes offer many advantages over the traditional metal pipes previously used in fluid transportation. For example, thermoplastic pipes are not subject to the many types of corrosion which destroy metal pipes and also have the advantage of lightness of weight and resistance to impact.

Plastic pipes are presently used to an ever increasing extent both as primary gas supply mains and as branch lines connecting the primary supply mains to other points of gas consumption. After a supply main is placed in use, it frequently becomes necessary to connect additional branch lines with the main. It is normally necessary to tap the supply main under pressure so that gas may be transported away from the main at a point where no previous provision for tapping has been made. To obviate the necessity of completely shutting off the gas pressure from the main while a tap is being made, various methods have been developed to tap the main while it remains under pressure. Since it is important that the added connections be made quickly, safely, and without interrupting the operation of the supply main, an economical but efficient method for connecting a plastic branch line with an operating main is desirable for use with plastic as well as metal pipes.

Methods which employ several types of saddle-fittings have been developed for connecting plastic branch lines to operating mains. Normally a plastic service T is physically attached to the outside at the main by solvent welding or mechanical clamping against a resilient sealing element. When mechanical clamping is used, stirrups or bails are commonly employed to surround the main line and to engage portions of the service T drawing it against the line. Gaskets formed from lead, rubber or other elastomeric materials are used to insure a fluid-tight seal between the branching connection and the T. Similar gaskets are also used to form a fluid-tight seal between the main pipe line and the face at the service T. While various types of mechanically clamped T's have been used successfully, rapid corrosion of the mechanical connectors, the high cost of component parts, and the non-permanent nature of the sealing gaskets present serious problems for potential users.

When solvent welding is used to connect the service T to the main line, a particular selection of weldable plastics and solvents is usually necessary for completing the installation. This limits the application of such connections to readily dissolvable thermoplastic materials that are known for joint weaknesses. Since fracture often results at the adhesive joint, serious safety problems arise when solvent welding techniques are employed.

Recently, heat fusion techniques have been used to connect a tapping and valve assembly to a plastic main. Shields, U.S. Pat. No. 3,176,708, discloses a plastic tapping and valve assembly which is heat fused to a plastic main. While this assembly provides a 90° service outlet and a built-in valve that can be used to close off the service line, its many component parts and complex features make it both expensive and difficult to produce.

In addition, the design of the Shields tapping and valve assembly greatly restricts the size of the branch line which can be connected to an operating main. Although this tapping and valve assembly can be conveniently used to connect smaller diameter branch lines to operating mains, it is not used to connect a branch line to a main where both the branch and main have the same diameter.

The many deficiencies of the prior art branching techniques create the need for a simple, low cost, efficient and safe method for connecting branch lines with operating supply mains.

SUMMARY OF THE INVENTION

Since previous methods for connecting plastic branch lines to an operating plastic main have proved to be slow and costly with the resultant connection being non-permanent, a quick and efficient method was developed for connecting a plastic branching saddle assembly to a plastic main containing a pressurized fluid. The saddle assembly, which consists of a saddle member shaped for engagement with the plastic main and a tubular body member extending from the saddle member, is thermally fused to the main. A pipe cutting element is inserted into the tubular body members of the saddle assembly and rotated until an opening is formed in the main. This opening is preferably made without introducing fine particles or pieces of plastic into the main. Normally this is achieved by using a cutting element which attaches to the cut portion of main as the cutting element moves through the pipe wall. After the opening in the main has been made, the cutting element is retracted from the tubular body member and an external mechanical force is applied to the walls of the tubular body member sufficient to force the walls together and prevent gas flow from the main. A new section of plastic pipe is then joined to the tubular member of the saddle assembly and the mechanical force applied to the walls of the tubular body member released. This causes the walls of the tubular body member to return to their natral shape permitting gas to flow from the main through the newly joined section of plastic pipe.

The primary advantages of this method of installing a plastic pipe branching saddle on an operation main are the relative simplicity and low cost of installation, and the permanent nature of the connection which is made. Although many plastic materials may be used in the practice of this invention, polyethylene is preferred because of its wide use in the gas distribution field.

BRIEF DESCRIPTION OF THE DRAWINGS

The invention will be better understood by reference to the accompanying drawings in which:

FIG. 1 is a perspective exploded view of the branching saddle assembly of this invention showing the relationship of parts prior to engagement with the plastic main;

FIG. 2 is a perspective view of the branching saddle assembly and main being heated by a joining tool;

FIG. 3 is an elevation cross-section of the branching saddle assembly and plastic main showing the saddle assembly secured to the main;

FIG. 4 is an elevation cross-section of the branching saddle assembly secured to the main showing the position of the parts of the assembly immediately after the main has been tapped; and FIG. 5 is a front elevation of the branching saddle assembly secured to the main supply line with the parts of the assembly shown after the opening in the main has been made, the cutting element has been retracted, a new section of pipe joined to the end of the saddle assembly and an external mechanical force applied to the walls of the saddle assembly.

DESCRIPTION OF THE PREFERRED EMBODIMENT

Referring now to the drawings, there is shown in FIG. 1 the primary supply main 1 and the elements of the branching saddle assembly used in connecting a branch line to a supply main. The parts of the branching saddle assembly may be formed from various plastic materials known in the art as discussed hereinafter. Structurally, the saddle assembly is provided with an enlarged saddle member, shown at 2, which is cylindrically-contoured to furnish snug engagement with the outer surface of the plastic main. The saddle member 2 is constructed to permit the insertion of a cutting element which may be rotated radially with respect to the main. The branching saddle assembly is also provided with an elongated tubular body member 3 (preferably with its length at least 5 times its diameter) which is connected to the saddle member 2 by thermally fusing the inner surface of coupling 4 to the joined outer portions of the saddle member 2 and tubular body member 3. This joint as shown in FIG. 3 is made by first heating the outer surfaces of the body and saddle members and the inner surface of the coupling 4 with a standard heating tool, and then inserting the ends of the body and saddle members into the coupling to form a joint as shown at 5.

In order to connect a service line 7 into a pressurized supply main 1 having a wall thickness of between .06 to .50 inch, the coupled assembly 8, as shown in FIG. 2, is attached to the outside main 1 by a standard heat fusion technique. This is normally accomplished by wiping the exterior surface of the plastic main free from dirt, grease or other foreign objects with a soft rag or paper towel. The surface of the main, in the area at which bonding takes place, is scraped with an abrasive cloth to remove between .005 and .010 inch of surface layer insuring an adequate bond between the main and saddle assembly. The underside of the shaped portion of the saddle member 2 may also be wiped clean and scraped with an abrasive cloth if it has become unnecessarily contaminated with dirt and grease through rough handling or long storage. Following any necessary cleaning and scraping operations, a standard heating tool 9 with convex and concave faces is placed between the shaped portion of the saddle member 2 and the outer surface of the supply main 1 at the desired point of attachment. The tool is then heated to a temperature of about 425° F. to 575° F. and applied to the main and saddle assembly, as shown in FIG. 2, for 30 seconds to adequately soften the plastic materials suitable for use with this invention. Once the exterior surface of the main and interior surface of the saddle member are softened, the heating tool is removed and the softened surfaces of the main and saddle joined as shown at 10 of FIG. 3. After the saddle assembly and main are cooled, the flange adaptor 6 is attached to the saddle assembly by a similar heat fusion technique.

Then a flanged packing gland 11, which provides a fluid-tight seal between the saddle assembly and the atmosphere, is secured to the flange adaptor 6 by attaching the back-up ring 15 to the packing gland 11 with bolts 12. As a safety measure prior to cutting the main, air under pressure is applied through the top of the packing gland 11 to check for leakage at the bonded surfaces of the main and saddle assembly.

Then cutting element 13, as shown in FIG. 4, is inserted into passageway 14 of the saddle assembly. Although any conventional plastic pipe cutting can be used to form the required opening in the main, care must be taken to select a cutting element which will minimize the quantity of fine pieces of plastic which might enter the supply main. Preferably the cutting head 16 makes an annular cut through the main and permanently retains the coupon, i.e., the central disc within the cut formed by the cutting head 16, so that it may be withdrawn from the saddle assembly with the cutting element.

After the cutting action has been completed, the cutting element 13 is retracted to some point between the flanged connection and the packing gland. A mechanical clamping device 17 is then placed over the center portion of the tubular body member 3 and an external force applied to the walls of the body member which is sufficient to close off potential gas flow from the main. The packing gland 11 is then removed from the assembly by loosening bolts 12. After the packing gland 11 is removed, the tubular body member is cut at point between the clamping device 17 and the flange adaptor 6. A new section of plastic pipe 7 is then joined to the end of tubular body member 3 using coupling 18 and standard heat fusion techniques. The external mechanical force applied to the tubular body member by clamping device 17 is then released permitting the walls of the tubular body member to return to their natural shape and allowing gas to flow from the main 1 through the newly joined section of plastic pipe 7.

Although any plastic material which is not damaged by the application of an external mechanical force sufficient to deform and close-off the walls of a pipe made from the plastic can be used in the practice of this invention, polyethylene pipes are preferably used because of their mechanical flexibility and wide use in existing gas distribution systems. The method of this invention is useful at the pressures normally encountered in gas distribution systems, i.e., 60 p.s.i.g.; but the same method for connecting branch lines to an operating main can conceivably be used at pressures greater than 60 p.s.i.g.

The characteristics of the method described herein which make it especially useful are the simplicity of installing the branching saddle assembly and the new capability of installing branch lines having the same diameter as the supply main. In addition, the heat fusion of the saddle assembly to the main insures that a permanent long-lasting connection will be made. Various impact tests conducted on the saddle assembly showed the unusual strength of the saddle-to-main bond. Extensive field tests also showed that structural failures occurred more readily at the plastic branch line than at the saddle assembly when the impact strength of the saddle assembly was tested.

As many apparently widely different embodiments of this invention may be made without departing from the spirit and scope thereof, it is to be understood that this invention is not limited to the specific embodiments thereof except as defined in the appended claims.

What is claimed is:

1. A method for connecting a plastic branching saddle assembly to a plastic main having a pressurized fluid therein, said saddle assembly having a saddle member shaped for engagement with said plastic main and a tubular body member extending from said saddle member, the steps of which comprise thermally fusing the shaped portion of said saddle member to said main, attaching a flange adaptor by thermal fusion around the outer circumference of said tubular body member at the end of said tubular body member which is opposite to that which is attached to said saddle member, inserting into said tubular body member with said attached flange adaptor a plasitc pipe cutting element which forms a fluid-tight engagement therewith, rotating said cutting element to form an opening in said main, retracting the cutting element from said tubular body member with said attached flange adaptor, applying external mechanical force to the walls of the tubular body member at a point between where said flange adaptor is attached to said tubular body member and where said tubular body member is attached to said saddle member sufficient to shut off gas flow from said main, cutting said tubular body member between said point at which said external mechanical force is applied and where said flange adaptor is attached to said tubular body member to form a cut end on said tubular body member, joining a section of plastic pipe to said cut end of said tubular body member, and releasing the mechanical force on said tubular body member to admit the flow of fluid through said joined section of plastic pipe.

2. The method of claim 1 in which the shaped portion of said saddle member is thermally fused to said main by preheating a heat joining tool to about 425° F to 575° F., inserting said heat joining tool between the shaped portion of said saddle member and the main, heating both the saddle member and main until each of sufficiently softened, removing the heat joining tool and pressing together the shaped portion of said saddle member and said main.

3. The method of claim 1 in which the length of said tubular body member is at least five times its diameter.

4. The method of claim 1 in which said tubular body member is pressured with air to check the thermally fused surfaces of the shaped portion of said saddle assembly and said main for leakage prior to inserting said cutting element into said tubular body member.

5. The method of claim 1 in which said plastic branching saddle assembly and said plastic main are made from polyethylene.

References Cited
UNITED STATES PATENTS

| | | | |
|---|---|---|---|
| 3,035,958 | 5/1962 | Wilkins | 156—306 X |
| 3,102,442 | 9/1963 | Black | 77—38X |
| 3,176,708 | 4/1965 | Shields | 137—318 |

ALAN COHAN, Primary Examiner

U.S. Cl. X.R.

77—40; 137—18